July 20, 1954  O. B. HARTRAMPF  2,684,155
OVERHEAD SYSTEM OF GRADING FRUIT BY SIZE
Filed Oct. 1, 1949  5 Sheets-Sheet 1
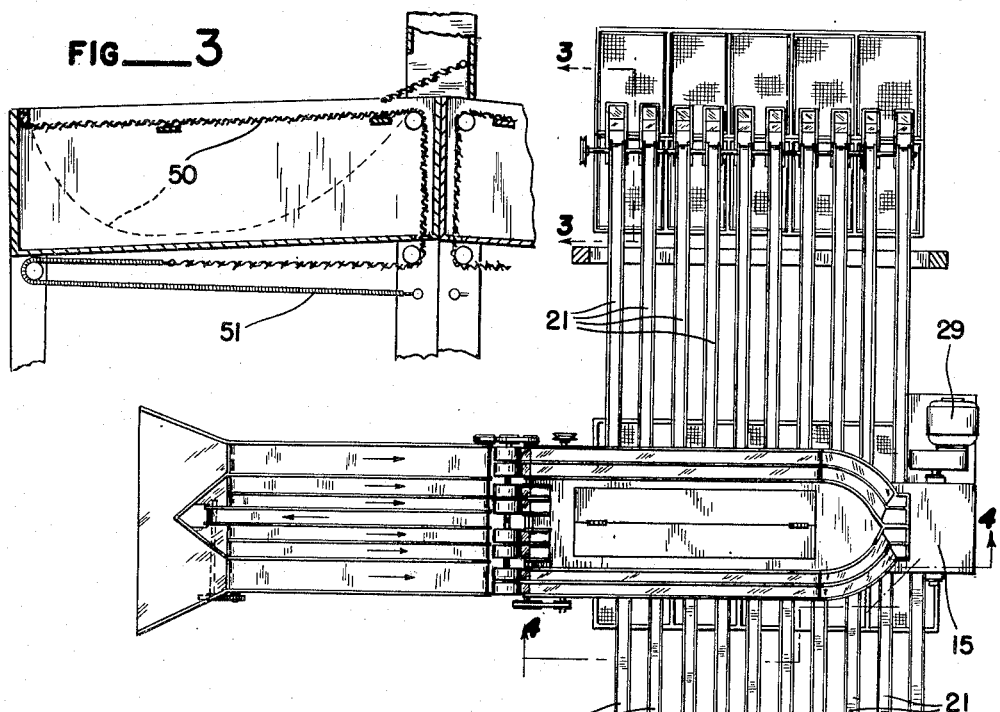
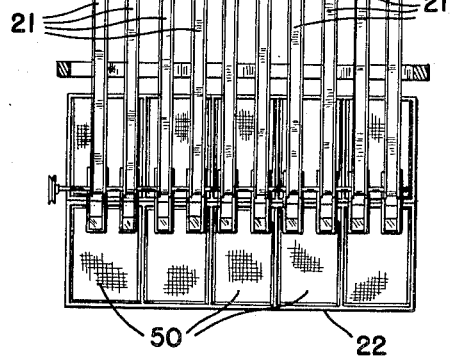
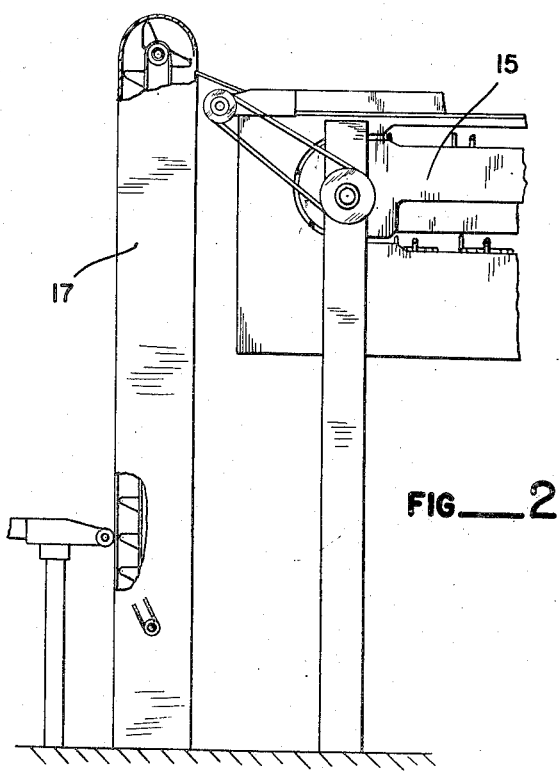
OTTO B. HARTRAMPF
*INVENTOR.*
BY *Smith & Tuck*
ATTORNEYS

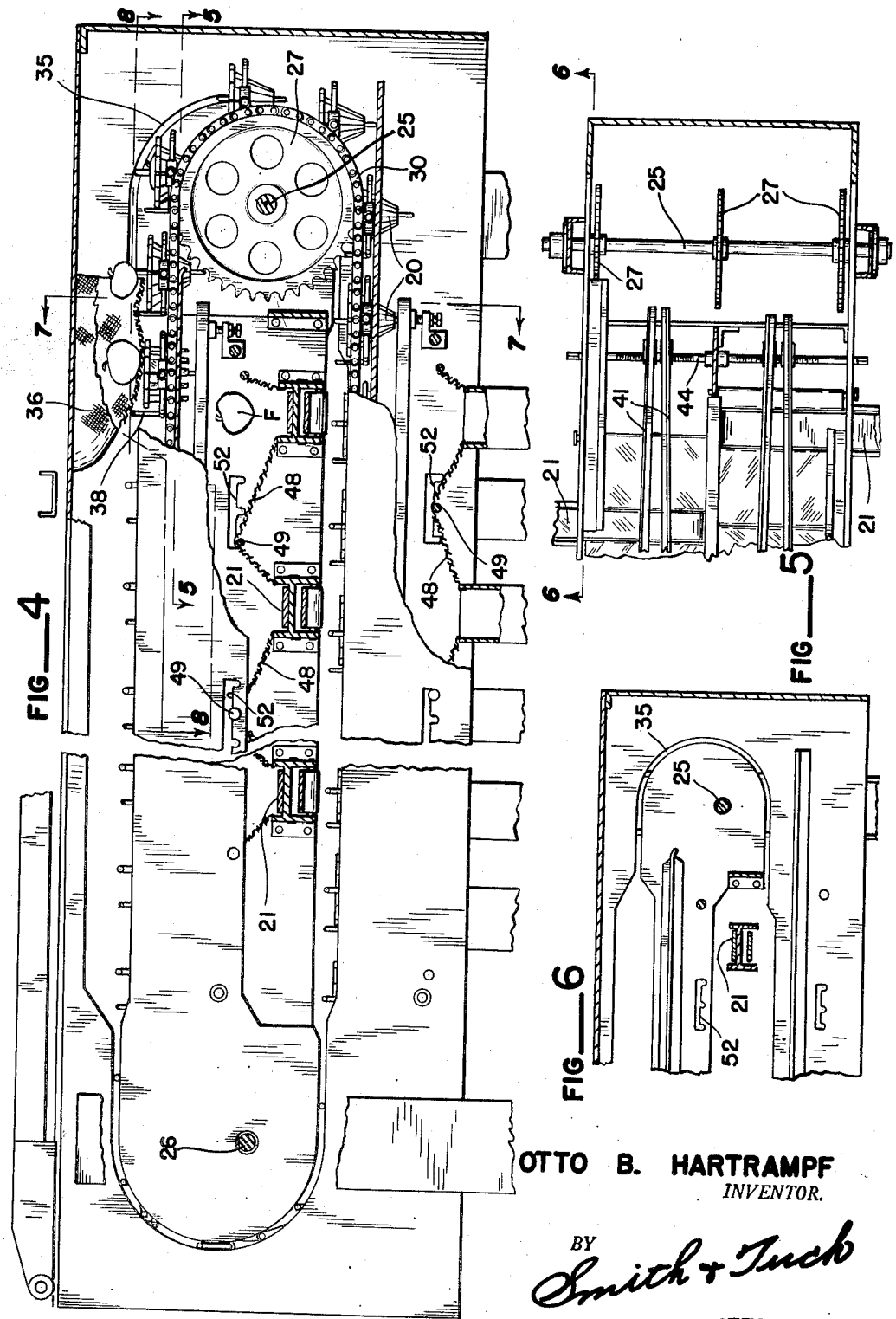

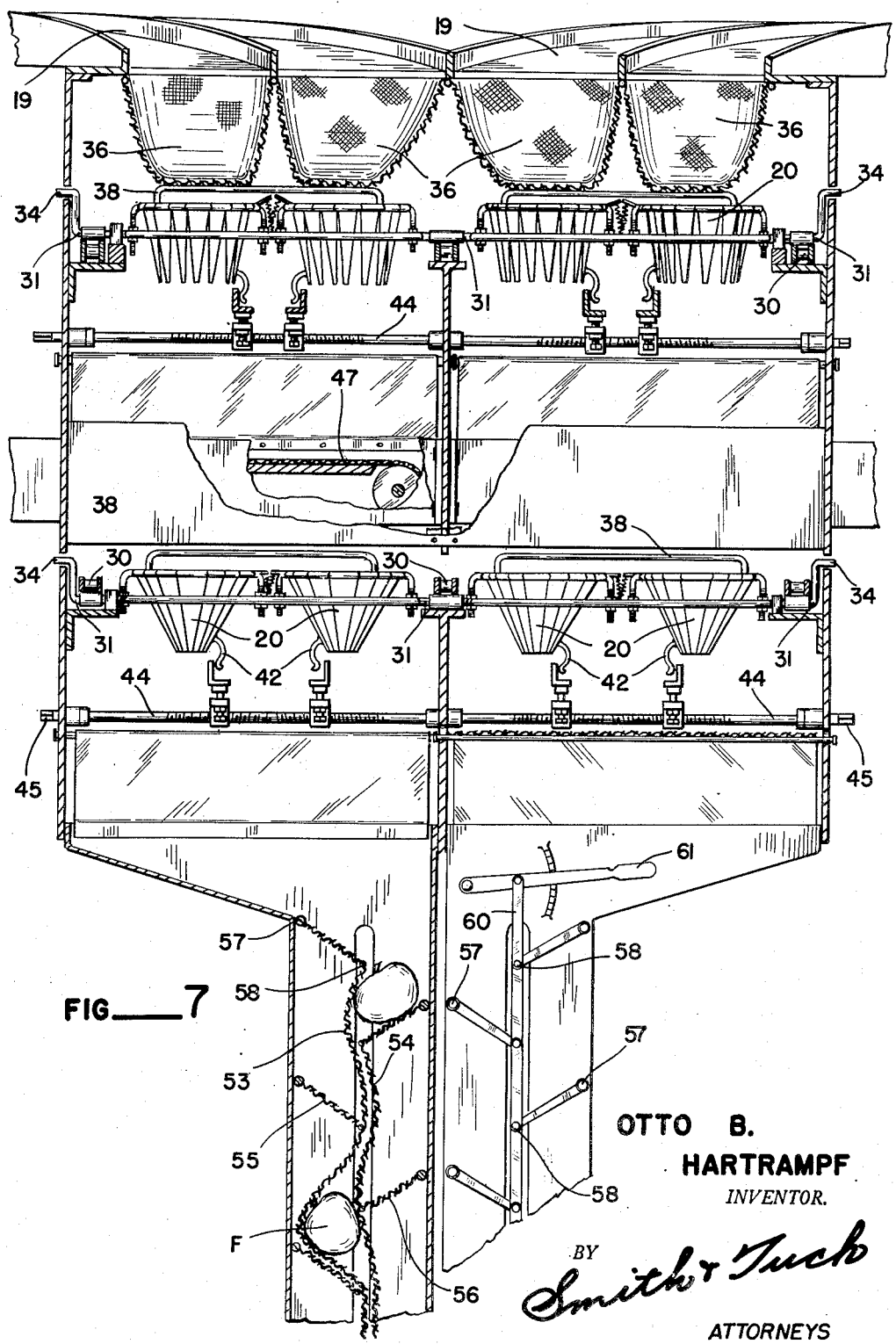

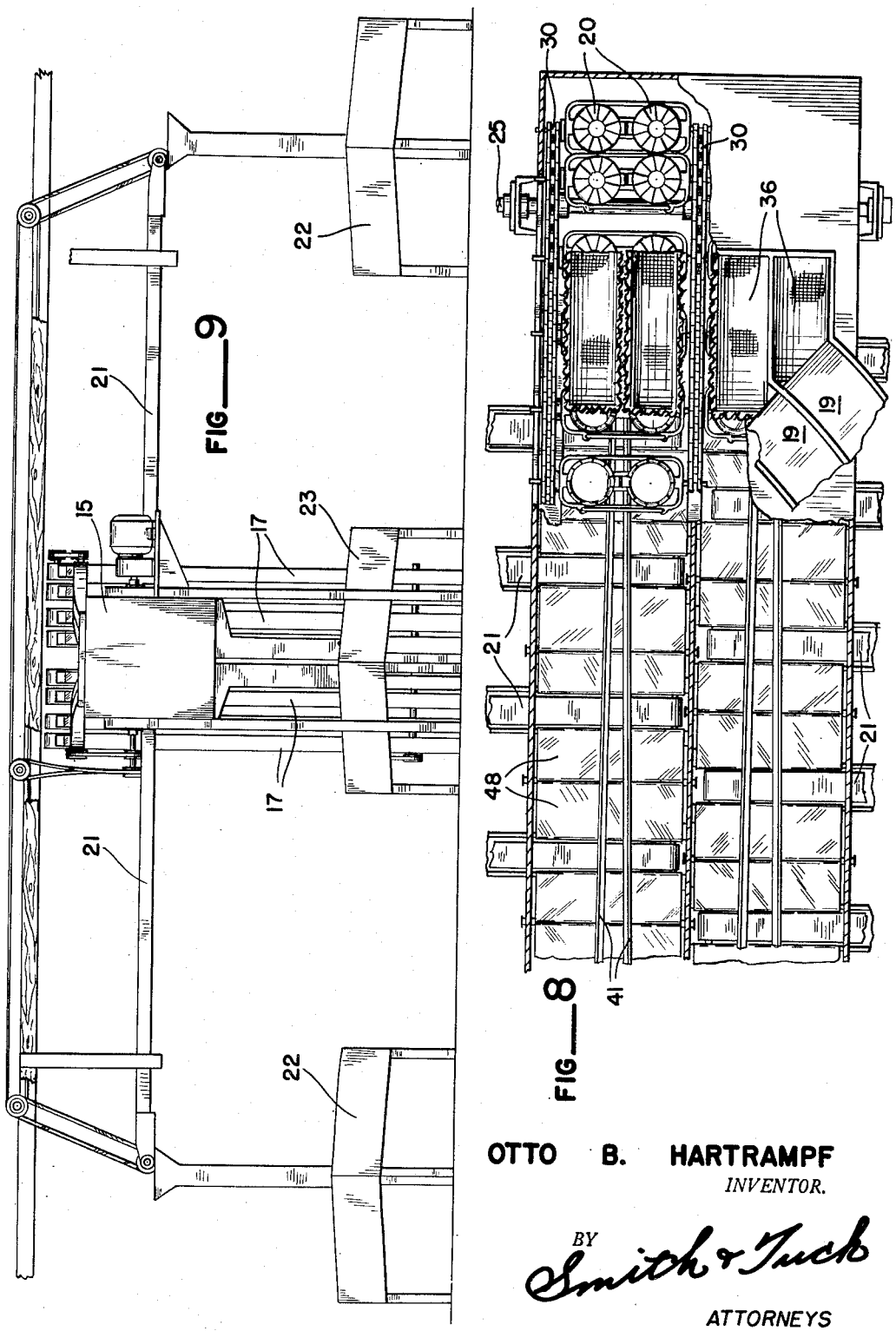

July 20, 1954  O. B. HARTRAMPF  2,684,155
OVERHEAD SYSTEM OF GRADING FRUIT BY SIZE
Filed Oct. 1, 1949  5 Sheets-Sheet 5
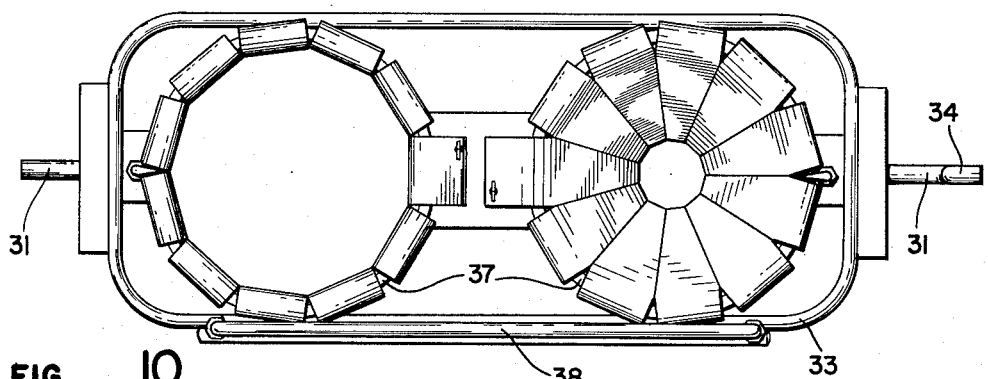
FIG__10
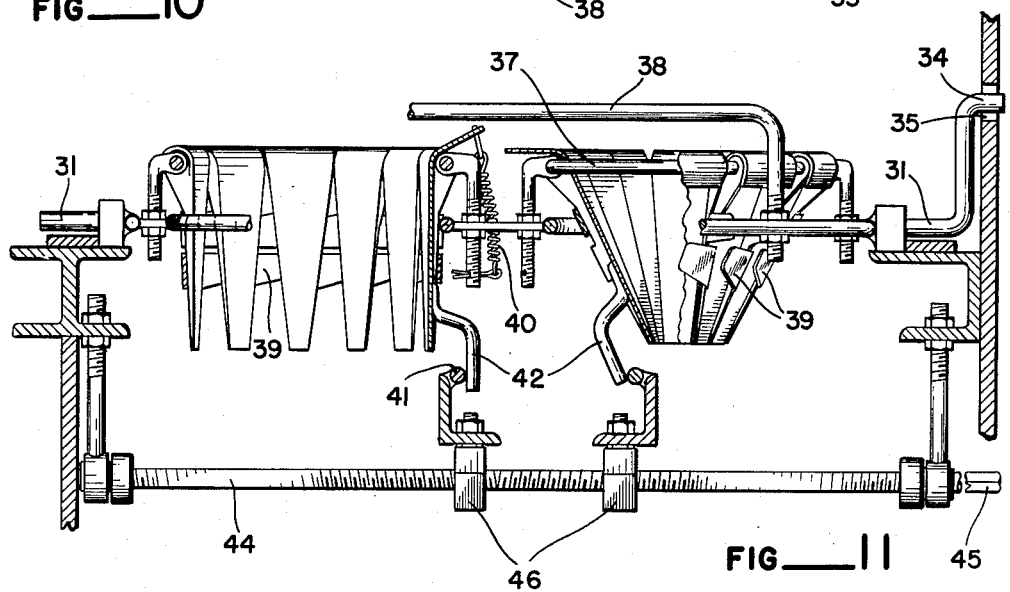
FIG__11
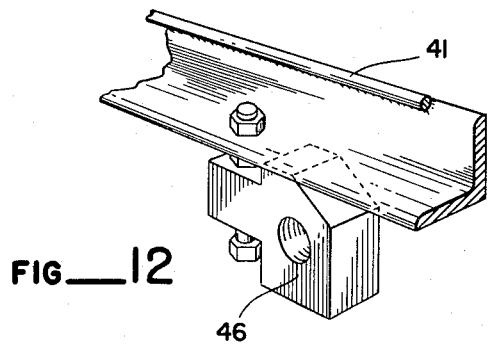
FIG__12
OTTO B. HARTRAMPF
INVENTOR.
BY Smith & Tuck
ATTORNEYS Patented July 20, 1954

2,684,155

UNITED STATES PATENT OFFICE 2,684,155

OVERHEAD SYSTEM OF GRADING FRUIT BY SIZE

Otto B. Hartrampf, Hillsboro, Oreg.

Application October 1, 1949, Serial No. 119,116

12 Claims. (Cl. 209—84)

This present invention relates to the handling of fresh fruit in the process which takes place between the picking and the packing of the same, and relates specifically to an arrangement of parts wherein all the fruit is elevated and then centered in a grading machine, all of which is disposed well above the heads of persons working underneath the frame. By the employment of this system, a great saving can be effected in the space required for the handling of fruit, and the fruit itself is conveyed only over relatively short distances and thus the likelihood of bruising or other damage is greatly reduced.

It has been common in the past to employ large numbers of people on relatively large areas in the sorting and grading of fruit, just prior to the packing of same in the final shipping containers, and the sizing equipment used formerly was disposed at a convenient height so that an observer on the floor could watch the passing of the various parts, and this meant that an entire area was devoted to machine equipment and the packing and other handling must, of necessity, be done elsewhere. This costly arrangement and such limited periods of use for expensive facilities is no doubt one of the contributing factors to the present high cost of fruit, which in many cases has elevated the same to the luxury class and the very healthful and enjoyable food has been denied persons of limited means.

Considering the fact that the processing of fruit is all consummated within a relatively short period, it will be apparent that, if economical operation is going to be achieved, maximum use must be made of all floor space, and it is to serve this purpose that this present invention has been created so that it will be possible to employ a fruit grader that will be entirely above the heads of the persons working on the passing and handling of the fruit.

The principal object of this present invention, therefore, is to arrange the fruit grading means well above the heads of the operators and thus permit a maximum amount of use and traffic about and under the graders.

A further object of the present invention is to provide an overhead grading system for fruit that will be economical in first cost, first as to the grading equipment itself, and secondly as to the installation and housing of the same.

A further object of this invention is to provide an overhead system for grading fruit in which, after the fruit has been sized, it can then be moved relatively short distances by gravity to a position at convenient height to the packers, sorters, and other persons involved in the processing of the fruit.

A further object of the invention is to provide means wherein all changes can be made in the graded sizes while the equipment is in operation so that standard packs can be achieved, even though there is a slight variation in the general size of the fruit.

A further object of this invention is to provide a grading device for use with an overhead grading system which makes it possible to grade a large amount of fruit in a relatively small space requirement for the grading equipment.

Further objects, advantages and capabilities will be apparent from the description and disclosure in the drawings, or may be comprehended or are inherent in the device.

In the drawings:

Figure 1 is a top plan view of a grader adapted for use with my system, together with the various feed and discharge belt conveyors employed therewith.

Figure 2 is a side elevation of a typical elevator used with this equipment.

Figure 3 is a vertical sectional view, partly in section, illustrating a resilient fruit receiving depository used with this equipment.

Figure 4 is a side elevation of my grading device, with certain parts broken away and shown in section, to better illustrate the construction, taken substantially along the broken line 4—4 of Figure 1.

Figure 5 is a horizontal sectional view taken along the line 5—5 of Figure 4.

Figure 6 is a vertical sectional view taken along the line 6—6 of Figure 5.

Figure 7 is a fragmentary vertical sectional view taken along the line 7—7 of Figure 4, with the various parts shown on an enlarged scale.

Figure 8 is a top plan view, partly in section and with certain parts broken away showing the right hand end of the grading device, shown in Figure 1, the same being shown in an enlarged scale.

Figure 9 is an elevation of the parts shown in Figure 1 taken as viewed from the right hand side thereof.

Figure 10 is a top plan view of my fruit grader or caliper cup with one of the cups shown open, and the other in its most closed position.

Figure 11 is a vertical sectional view taken substantially along the longitudinal axis of Figure 10.

Figure 12 is a fragmentary perspective view showing the cam rail and the means employed to support the same.

Referring more particularly to the disclosure in the drawings, the broad features of the invention are best shown in Figures 1, 2, and 9, in which the grading device is shown generally at 15, positioned, normally, centrally with respect to the grading room and in close proximity to the ceiling of the same. Fruit is supplied to the grading device by a plurality of elevators 17, or by any other appropriate means where they are directed by a plurality of troughs as 19, into the caliper cups 20 of the grading device. After being sorted according to size or weight, the fruit is deposited upon the appropriate transverse conveyor belts 21, which carry them to the processing tables 22, disposed in the margins of the room and to the central processing tables 23. With this arrangement it will be noted that the clearance under the transverse conveyor belt 21 is more than adequate for the average person to walk under with convenient clearance. This general arrangement makes for a very compact unit, which will achieve the various objects set forth in the preamble of the specification, and has proved to be a great saver in space, in initial installation cost, and, owing to the fact that the fruit is conveyed but a short distance before being processed or packed, little damage is inflicted on the fruit.

In order that full advantage can be taken of this unique overhead grading arrangement, it has been found necessary to provide elements to serve the various purposes which must be integrated into a whole unit, because the entire mechanism is dependent upon the cooperative action of the various elements combined. The elevator 17, which serves to convey the fruit to the upper portion of the grading mechanism has not been illustrated in detail as a variety of arrangements may be used to achieve this end result.

The fruit grader designated, generally, by the reference character 15, has some features in common with my prior patent, No. 1,680,880. In its new form, about all that has been retained of the former development is the caliper cup arrangement, it being necessary to entirely reconstruct the machine to make it serve in this new arrangement.

The fruit grader that has been found best adapted for use in this present system is fully illustrated in Figures 4, 5, 6, 7, and 8, supplemented by Figures 10, 11, and 12, which show the caliper cup in its adaptation to this system. At each end of the grading device is disposed transverse revolvable shafts 25 and 26, on which are fixedly secured a plurality of chain driving sprockets 27. A suitable arrangement is that shown in Figure 5, in which three sprockets 27 are employed with each of the two transverse shafts. One of the shafts must be suitably driven as by the electric motor 29.

Operatively disposed upon sprocket 27 are suitable link chains, preferably of the roller chain type, as 30, and at closely spaced intervals, attachments are provided in a transverse line across the three chains to which are suitably secured the trunnions 31, of the caliper cup frames 33. By having trunnions centrally disposed and above the center of the path, the chain can travel around the sprockets 27, after the showing of Figure 4, where it will be noted, that by suitable guiding means, the caliper cups are at all times in a fruit carrying position, with their upper surfaces always in a horizontal plane. One of the trunnions, as 31, is provided with a crank, having the crank end portion 34 which is adapted to engage an arcuate guiding slot 35, as is illustrated in Figures 4 and 11.

It is to be noted in Figures 4 and 7 that as the fruit rolls or is conveyed along the troughs or guide-ways 19, it is finally disposed in a fabric chute end, as 36, which has considerable length longitudinally of the line of movement of the chain. The fruit is selected and deposited into each of the cups 20 by means of bar 38, which, after the showing of Figures 4 and 7, presses upwardly on the undersides of the slack fabric member 36, and in that manner causes a single apple or the like fruit to be pushed gently off the end of the fabric chute into the cup. Each cup 20, as explained more fully in the previous patent referred to, is composed of a large number of leaf members which are so provided with over-locking tongues 39 that the movement of any one of these tongues or leaves, serves to move all of the leaves to the same degree. Therefore, with all the various leaves pivoted or hooked onto the circular rod 37, one of the leaves is taken as a master leaf and provided with a tension spring as 40, which tends to, at all times, close the cup. The opening of the cup and the final discharge of the fruit is effected by the movement of the cup along an angularly disposed guide rail or cam 41, and connection is made to this guide, or cam rail by the depending arm 42. This functioning is probably best shown in Figures 7 and 11.

The positioning of rails 41 are subject to very convenient adjustment by means of a plurality of transverse rods 44, which may be adjusted from one end, as by a wrench fitting on the deformed end 45, and as they carry a right and a left hand thread, the threaded blocks 46, which support the cam rail 41, can thus be adjusted uniformly the same amount. By the relative adjustment of the two ends of rails 41, any convergent angle can be achieved, as is illustrated in Figure 8. The sizing of the fruit can be always under control of the operator as he can adjust cam rails 41 so that the cups are substantially closed at the beginning of their travel and then gradually open up and the fruit will drop through the lower open end of the cup when it has opened up an amount sufficient for it to pass through.

To assist in making small changes in grade size, means is provided for changing the apex of the fabric guide members 48. The apex forming and supporting rod 49 may be varied in position by means of the locating notches in brackets 52. By referring to Figure 4 it will be noted that three positions are provided for. Now each successive cup as it comes along its course of travel will be likewise affected and all fruit of the same size will be deposited on the same belt, and as a large number of transverse belts 47 are employed, a very fine graduation of sizing is available to the user.

In order that the fruit can be handled without damage to itself, it is essential that every point of handling be carefully studied to prevent squeezing, crushing or dropping the fruit on any hard surface. It will be noted that the various leaves making up the cups are held in the closed position by the relatively light spring 40, so as fruit is deposited in the same it tends to spring or be resilient in receiving the fruit and thereby accepts it without damage. Further, as the grading or size progresses it will be noted that the leaves open outwardly and thus in no way could any additional pressure be placed on the fruit.

With the same thought of preventing damage to fruit, reference is made to Figure 3, in which, as the fruit is deposited on the fabric curtain 50, the curtain is resiliently supported by the tension spring 51, which again is resilient and the surface receiving the fruit, being fabric, does not cause any damage to the same.

Following these principles, attention is further directed to the means employed for lowering the fruit from the grading level to the packing level, as is illustrated in Figure 7. Here it will be noted are two substantially parallel disposed fabric curtains 53 and 54. These are generally positioned by fabric ties as 55 and 56 which are suitably held in position by wire frames. These are pivoted, first at 57, and then have a second pivot as at 58 pivoted to a movable link bar 60, which in effect, is a chain provided with links connected by pivots 58. This bar is capable of being moved up or down by the adjusting lever 61. The adjustment of this lever, as will be noted by the action of fruit F passing down the left hand side of the figure, makes the passageway more or less tortuous, either to slow the fruit in its descent, or to adjust the device for fruit of different sizes.

It is believed that it will be clearly apparent from the above description and the disclosure in the drawings that the invention comprehends a novel construction of an overhead system of grading fruit by size.

Having thus disclosed the invention, I claim:

1. A sorting machine, comprising: a series of caliper cup article containers, each article container having a supporting ring and a series of leaves depending from said ring, said leaves having interengaging means between adjacent leaves so that said leaves open and close together, said containers being secured together in pairs side-by-side; an endless flexible carrier at each side of said pairs of containers, supporting means for said endless carriers disposing said carriers to travel in a path including an upper and a lower horizontal grading run connected at their ends by curved ascending and descending runs whereby the path appears horizontally elongated when viewed from the side, said pairs of containers being hung from said endless carriers in a manner so that said rings lie in horizontal planes throughout their paths of travel; spring means connected to said leaves and biasing them to a normally closed position; a pair of guide rails generally aligned with the path of travel of said containers in each horizontal grading run and disposed at a level below the supporting rings in said horizontal run and a master leaf of the leaves of each container having a finger extending to bear against a guide rail in said horizontal run and said guide rails being disposed to gradually bias said fingers in a direction opening said leaves as said article containers travel said horizontal run; supporting rods running transversely of said pair of guide rails, said supporting rods having threaded portions with oppositely directed threads at either side of the middle thereof and one of said guide rails being disposed on each threaded portion and having threaded openings with matching threads in which said rods are positioned, whereby the position of said guide rails may be adjusted by rotation of said supporting rods and the timing of opening of the article containers can be changed while the sorting machine is in operation.

2. A sorting machine, comprising: a series of caliper cup article containers, each article container having a supporting ring and a series of leaves depending from said ring, said leaves having interengaging means between adjacent leaves so that said leaves open and close together; supporting means for said article containers carrying the same in a path including a grading run in which said article containers are carried with said supporting rings lying in horizontal planes throughout the grading run; one of said leaves of each article container having an arm extending from its upper portion and a tension spring secured to said arm and connected to said supporting means biasing said arm in a direction so that the lower end of the associated leaf is forced inwardly forming the sole means biasing the leaves to a normally closed position so that articles falling into the containers will be resiliently received by the leaves of the containers; a guide rail generally aligned with the path of travel of said article containers in said grading run and disposed at a level below said supporting rings and a master leaf of the leaves of each article container having a depending finger extending to bear against said guide rail, said guide rail being disposed to gradually bias said fingers in a direction opening said leaves as said article containers travel said grading run.

3. The subject matter of claim 2 in which there is manually operable means operative to shift the position of the guide rail to change the speed of opening the leaves of the article containers during the grading run, said manually operable means including manually operable control means external of the machine permitting adjustment of the guide rail positions during the operation of the sorting machine.

4. In a sorting machine of the type having a series of caliper cup article containers each having a supoprting ring and a series of leaves depending from said ring having interengaging means between adjacent leaves so that said leaves open and close together, the improvement, comprising: a pair of endless flexible carriers and power means for moving the carriers together and supporting means supporting said carriers to follow paths of travel lying in two parallel vertical planes, said containers being arranged in a series of pairs side by side and trunnion means pivotally connecting each pair of containers at each side to one of said carriers whereby said containers travel with said carriers, said paths of travel including an upper and a lower horizontal run connected at their ends by curved ascending and descending runs completing the paths of travel whereby the paths appear oblong when viewed from the side, said horizontal runs forming a first and a second grading run and means gradually opening said containers between the time each container starts the first grading run until the time each container finishes the second grading run.

5. In a sorting machine of the type having a series of caliper cup article containers each having a supporting ring and a series of leaves depending from said ring having interengaging means between adjacent leaves so that said leaves open and close together, the improvement, comprising: a pair of endless flexible carriers and power means for moving the carriers together and supporting means supporting said carriers to follow paths of travel lying in two parallel vertical planes, trunnion means pivotally connecting each container at each side to one of said carriers whereby said containers travel with said carriers, said paths of travel including an upper and a lower horizontal run connected at their ends by curved ascending and descending runs completing the paths of travel whereby the paths appear oblong when viewed from the side, said horizontal runs forming a first and a second grading run and means gradually opening said containers between the time each container starts the first grading run until the time each container finishes the second grading run.

6. The subject matter of claim 5 in which there are a series of article receiving means under both horizontal runs of said containers and spaced apart one from another therealong said article receiving means having chute-like flexible upper portions and chute supporting means supporting the upper ends of said flexible upper portions, said chute supporting means being adjustable to position said upper ends at various positions along said horizontal runs.

7. In a sorting machine of the type having a series of caliper cup article containers each having a supporting ring and a series of leaves depending from said ring having interengaging means between adjacent leaves so that said leaves open and close together, the improvement, comprising: a pair of endless flexible carriers and power means for moving the carriers together and supporting means supporting said carriers to follow paths of travel lying in two parallel vertical planes and trunnion means pivotally connecting each container at each side to one of said carriers whereby said containers travel with said carriers, said paths of travel including an upper and a lower horizontal run connected at their ends by curved ascending and descending runs completing the paths of travel whereby the paths appear oblong when viewed from the side, at least one of said horizontal runs being a grading run and means gradually opening said containers as they travel said grading run.

8. In a sorting machine of the type having a series of caliper cup article containers each having a horizontal supporting ring and a series of leaves depending from said ring having interengaging means between adjacent leaves so that said leaves open and close together, the improvement, comprising: an oblong open frame; a pair of endless flexible carriers and power means for moving the carriers together and supporting means supporting said carriers to follow paths of travel lying in two parallel vertical planes including a horizontal grading run; means securing a pair of said containers inside of said oblong frame side by side on either side of the middle of said frame and trunnion means pivotally connecting said oblong frame at each end to one of said carriers whereby said containers travel with said carriers, spring means connected to the leaves of each container and forming the sole means biasing them to a normally closed position, a pair of guide rails positioned below and generally aligned with the path of said containers in said horizontal grading run, each container having a finger depending from one leaf and bearing against one of said guide rails in said grading run and the guide rails being positioned to gradually bias the fingers outward opening the containers as they pass through said grading run.

9. The subject matter of claim 8 in which the path of travel of said containers includes both an upper and a lower horizontal grading run connected at their ends by curved ascending and descending runs completing the paths of travel whereby the paths appear oblong when viewed from the side and there are guide rails positioned below the containers in both horizontal grading runs.

10. The subject matter of claim 9 in which there is a crank arm fixedly secured to an end of each frame and guide means positioned to one side of the carriers having a guideway in which the outer ends of said crank arms are closely guided in the ascending and descending runs in a manner so that the horizontal disposition of the container rings is maintained.

11. The subject matter of claim 8 in which there is a feeding mechanism disposed above the path of travel of said containers and a pair of fabric chute ends on said feeding mechanism, and a horizontal bar secured to the trailing side of each frame at a level above the containers in the frame disposed to contact said fabric chute ends during the travel of the associated article containers past said feeding mechanism thereby pushing the contents of the chute ends into said article containers.

12. In a sorting machine of the type having a series of caliper cup article containers each having a supporting ring and a series of leaves depending from said ring having interengaging means between adjacent leaves so that said leaves open and close together, the improvement, comprising: three endless flexible carriers and power means for moving the carriers together and supporting means supporting said carriers to follow paths of travel lying in three parallel vertical planes, said supporting means including two horizontally removed pairs of three large sprocket wheels each supporting the carriers at the ends of the paths of travel, said containers being arranged in two groups each comprising a series of pairs side by side and trunnion means pivotally connecting each pair of containers at each side to one of said carriers with each group supported by a different outside carrier and by the middle carrier so that the containers travel four abreast with the carriers, said paths of travel including an upper and a lower horizontal run connected at their ends by curved ascending and descending runs completing the paths of travel whereby the paths appear oblong when viewed from the side, said horizontal runs forming a first and a second grading run and means gradually opening said containers between the time each container starts the first grading run until the time each container finishes the second grading run.

References Cited in the file of this patent

UNITED STATES PATENTS

| Number | Name | Date |
| --- | --- | --- |
| 282,719 | Gunckel | Aug. 7, 1883 |
| 515,812 | Barr | Mar. 6, 1894 |
| 976,871 | Hammond | Nov. 29, 1910 |
| 1,072,504 | Robinson | Sept. 9, 1913 |
| 1,133,436 | Gramling | Mar. 30, 1915 |
| 1,296,845 | Parker | Mar. 11, 1919 |
| 1,445,797 | Peirce | Feb. 20, 1923 |
| 1,680,880 | Hartrampf | Aug. 14, 1928 |
| 1,688,263 | Bullard | Oct. 16, 1928 |
| 1,839,712 | Sturtz | Jan. 5, 1932 |
| 2,344,596 | Carmina | Mar. 21, 1944 |